United States Patent [19]
Zrnic et al.

[11] Patent Number: 6,081,221
[45] Date of Patent: Jun. 27, 2000

[54] SIGNAL PROCESSING AND SYSTEMATIC PHASE CODING FOR MITIGATION OF RANGE AND VELOCITY AMBIGUITIES IN DOPPLER WEATHER RADARS

[76] Inventors: Dusan S. Zrnic; Mangalore Sachidananda, both of 1313 Halley Cir. Bl 600, Norman, Okla. 73069

[21] Appl. No.: 09/140,739

[22] Filed: Aug. 27, 1998

[51] Int. Cl.$^7$ .................................................. G01S 13/95
[52] U.S. Cl. .................. 342/26; 342/118; 342/134; 342/137; 342/145; 342/159; 342/189; 342/192; 342/195
[58] Field of Search .............................. 342/26, 118, 128, 342/130, 131, 134, 137, 145, 159–164, 175, 189, 192–197, 200–203, 61, 90, 204; 375/200, 206

[56] References Cited

U.S. PATENT DOCUMENTS

| | | | |
|---|---|---|---|
| 3,662,386 | 5/1972 | Bryant | 342/202 X |
| 3,831,174 | 8/1974 | King et al. | 342/90 |
| 4,443,799 | 4/1984 | Rubin | 342/201 |
| 4,679,048 | 7/1987 | Brandsetter et al. | 342/61 |
| 4,730,189 | 3/1988 | Siegal et al. | |
| 5,136,611 | 8/1992 | Kirimoto et al. | 375/200 |
| 5,150,125 | 9/1992 | Hager . | |
| 5,247,303 | 9/1993 | Cornelius et al. | |
| 5,442,359 | 8/1995 | Rubin . | |
| 5,847,677 | 12/1998 | McCorkle | 342/204 |

OTHER PUBLICATIONS

Phase Coding for the Resolution of Range Ambiguities in Doppler Weather Radar M. Sachidananda and Dusan S. Zrnic, American Meteorological Society 28th Conference on Radar Meterology, Sep. 7, 1997.

*Primary Examiner*—Bernarr E. Gregory
*Attorney, Agent, or Firm*—Patent & Trademark Services; Joseph H. McGlynn

[57] ABSTRACT

A method for resolving range ambiguities and separating overlaid signals in a Doppler weather radar is proposed. For uniform PRT transmission, it consists of a special deterministic code for phases of the transmitted pulsed, and associated decoding and processing of return signals. In the decoding process when the signal from one range interval is made coherent, the signal from the other range interval has a multiple split spectrum. The multiple spectra have the same shape but are offset from each other. Processing steps to separate the overlaid signals and a procedure to estimate the spectral moments are given. One crucial aspect in this procedure is the magnitude domain deconvolution. The magnitude domain deconvolution is also applied to a staggered PRT transmission scheme whereby it enables the estimation of spectral parameters with much lower standard error than the known methods. Moreover, the magnitude domain deconvolution combined with special spectral processing solves the outstanding problem of ground clutter filtering in the staggered PRT sample sequence.

6 Claims, 15 Drawing Sheets

MODULATION CODES, $\phi_k^q$

SWITCHING CODES, $\psi_k^q$

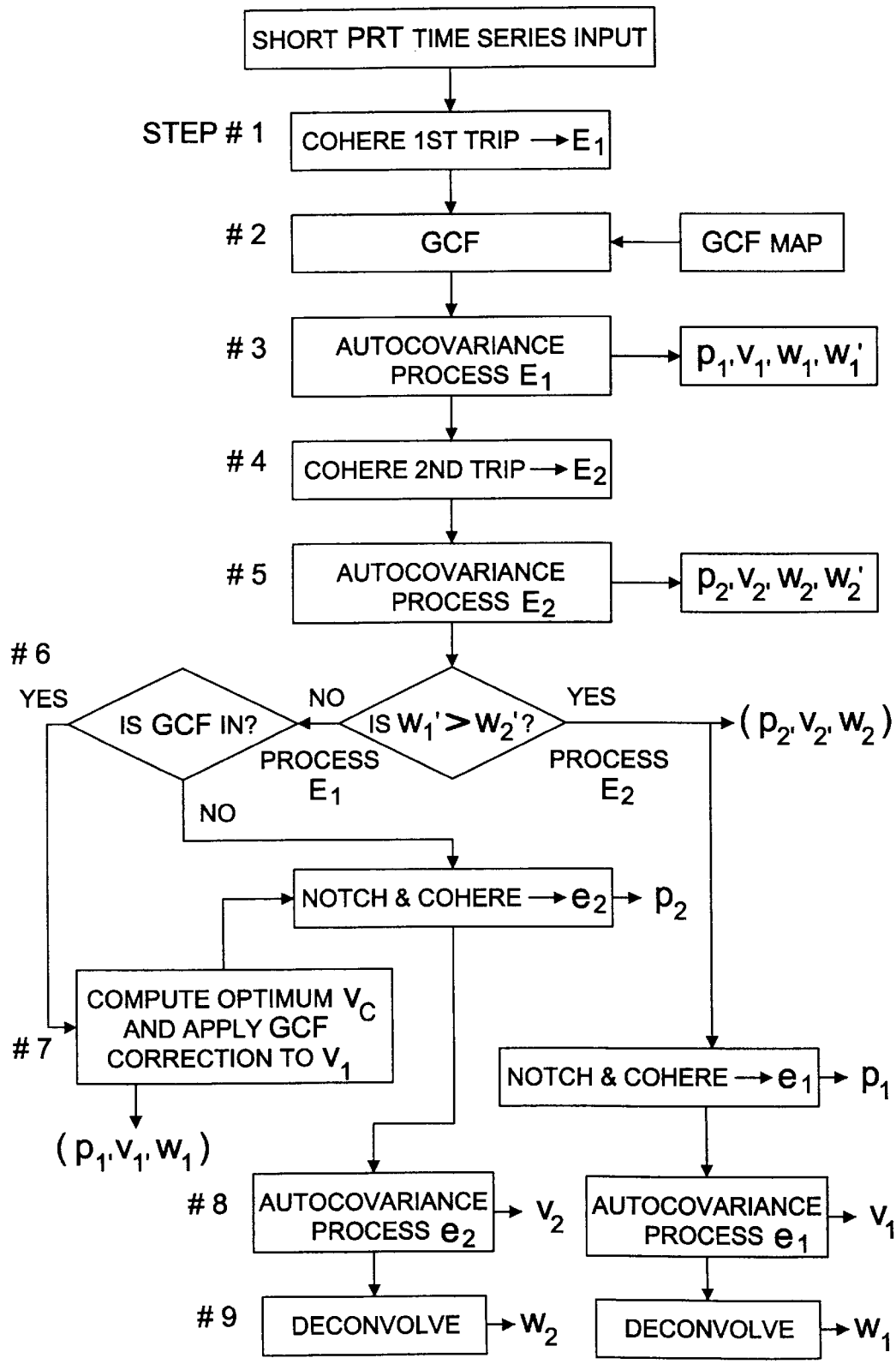

great SIGNAL PROCESSING AND SYSTEMATIC
PHASE CODING FOR MITIGATION OF
RANGE AND VELOCITY AMBIGUITIES IN
DOPPLER WEATHER RADARS

BACKGROUND OF THE INVENTION

This invention relates, in general, to Doppler weather radar range and velocity ambiguity resolution. In particular, (a) to phase coding and special processing of uniform PRT sequences for the mitigation of range ambiguities as well as, (b) to similar processing to mitigate velocity ambiguities and to filtering the ground clutter in staggered PRT sequences.

DESCRIPTION OF THE PRIOR ART

Range and velocity ambiguities are inherent in a pulse Doppler weather radar that operates at centimeter wavelengths. For a pulse repetition time (PRT), of T, the unambiguous range is cT/2 where c is the speed of light. The unambiguous velocity is given by $\lambda/(4T)$, where $\lambda$ is the wavelength. To achieve a large unambiguous range requires a long T, whereas a large unambiguous velocity is inversely proportional to T. Hence the two requirements are contradictory.

The problem is exasperated in surveillance radars at low elevation angles because the required pulse repetition time to clear all range ambiguities would cause excessive aliasing of Doppler velocities. Current operational radars of the NWS (National Weather Service) use two scans at low elevations, one at low PRT for a velocity measurement and the other at a higher PRT for a reflectivity measurement. Thus, reflectivities are not compromised but in the presence of widespread precipitation, velocity measurement is usually possible in only one unambiguous range interval or annulus of width $cT_v/2$. $T_v$ is the PRT for velocity measurement and it is usually 4 times shorter than the time $T_z$ for reflectivity measurement. In extreme cases of wide spread precipitation, echoes from four annuli ($cT_v/2$ wide) could be overlaid over each other.

Methods to mitigate range ambiguities are numerous and one of these involves random phase coding. In this method the phases of transmitted pulses are coded, purposely, as in the case of klystron transmitters or, inadvertently as in the case of magnetron transmitters. The code whitens the spectrum of the transmitted (and received) sequences. By recording the coded phase it is possible to reconstruct a coherent pulse sequence for echoes from any of the unambiguous range intervals. Thus, reconstruction of the stronger echo allows determination of its Doppler spectral moments. Subsequent filtering of the strong echo is done and the phases of the weaker echo are cohered so that its spectral moments can be computed. One of the weaknesses of the method is that filtering of the strong signal removes a significant portion of the weak signal. This generates self noise in the weaker signal. If only a small part of the strong signal is removed its residual will appear as white noise and degrade the spectral moments of the weaker signal.

Another method is the staggered PRT in which the spacing of transmitted pulses alternate between $T_1$ and $T_2$, both of which are chosen to be large so that the range ambiguities seldom occur. The unambiguous velocity interval is inversely proportional to the difference $|T_1-T_2|$. However, the variance of the velocity estimates is much larger than what it would be if the pulses were transmitted at a uniform PRT equal to $|T_1-T_2|$. Furthermore, no satisfactory procedure to eliminate ground clutter from the staggered PRT sequence has been demonstrated.

In the prior art various methods to resolve range and velocity ambiguities in a pulse Doppler radar system have been proposed. For example, U.S. Pat. No. 4,730,189 to Siegel et al discloses a Doppler radar system with a variable pulse repetition frequency that has a coherent integrator to which the reflected pulses are supplied in order to avoid deterioration of the indication of a moving target given over-the-horizon reception. The coherent integrator subjects the reflected pulses to a simplified vectorial addition by the use of filters.

U.S. Pat. No. 5,150,125 to Hager discloses a Doppler radar altimeter designed to resolve the ambiguous range problem associated with the use of a pulse repetition interval by transmitting a first and second series of pulses where the first series has a pulse repetition interval slightly different from the pulse repetition interval of the second series.

U.S. Pat. No. 5,247,303 to Cornelius et al discloses a Doppler radar system which reduces ambiguities in measured parameters by staggering at least one pulse of each frame of pulses transmitted. The staggered pulse creates an isolated pulse doublet pair to provide three or more independent and auxiliary Doppler parameter estimates; the undisturbed uniform PRT pulses are amenable to ground clutter filtering but the doublet pair is not.

U.S. Pat. No. 5,442,359 to Rubin discloses a method for resolving Doppler frequency shift ambiguities by providing a radiated signal that is modulated with a periodic waveform having a plurality of pulses within a period with the interpulse intervals in the period being unequal. Radar target returns are autocorrelated for a plurality of lags, which may include the interpulse intervals and linear combinations thereof.

SUMMARY OF THE INVENTION

The present invention is a method for resolving range and velocity ambiguities in a Doppler weather radar by coding the phases of the transmitted pulses in a deterministic manner to generate replicas of the spectra from either trips. When the signal from one range interval is made coherent, the signal from the other range interval has a multiple split spectrum. The spectra have the same shape but are offset from each other. The present invention also vastly improves spectral moment estimates in staggered PRT sequences and allows efficient removal of the ground clutter.

It is an object of the present invention to provide a new and improved method of resolving range and velocity ambiguities in a Doppler radar system.

It is an object of the present invention to provide a new and improved method of resolving range and velocity ambiguities in a Doppler radar system by coding the phases of the transmitted pulses of the radar in a deterministic manner.

It is an object of the present invention to provide an improved spectral processing procedure to estimate the spectral parameters in Doppler weather radar employing staggered PRT transmission to resolve range and velocity ambiguity.

It is an object of the present invention to provide a method to filter ground clutter in a Doppler weather radar using staggered PRT transmission.

These and other objects and advantages of the present invention will be fully apparent from the following description, when taken in connection with the annexed drawings.

BRIEF DESCRIPTION OF THE DRAWINGS

FIG. 3c shows a spectrum of the signal corresponding to FIG. 3b but after modulation with the SZ(8/64) code in FIG. 3a.

FIG. 5 shows a flow chart of significant steps in the procedure for recovery of the spectral moments of overlaid echoes.

DESCRIPTION OF THE PREFERRED EMBODIMENT

In the proposed implementation the phases of the transmitted radar pulses are coded in a deterministic manner to generate replicas of the spectra from either trips. That is, when the signal from one range interval is made coherent, the signal from other range intervals have multiple split spectra. The spectra have the same shape but are offset from each other. Filtering of the strong signal (in the Fourier transform domain) is much less detrimental to the desired weak signal than in the case of random phase coding. This is because the essential information about the signal is contained in the spectral replicas, therefore, as long as two of the replicas are preserved during the filtering process, the self noise would be small. In this manner it is possible to eliminate a larger portion of the strong overlaying signal and achieve a much smaller degradation of the weak signal than is possible with the random phase method. That is, the weaker signal can tolerate a much wider notch width of the filter.

Figure 1:
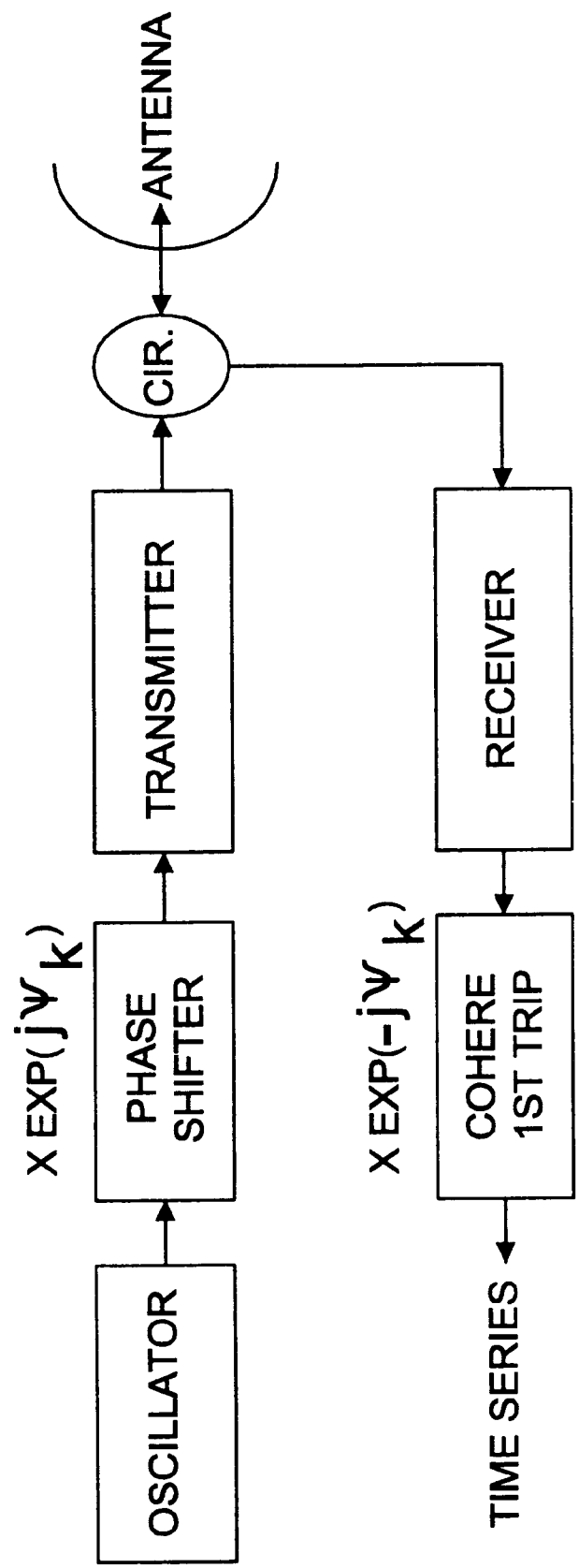
FIG. 1 is a block diagram of the functioning of a Doppler weather radar which uses phase coding.
Figure 2A:
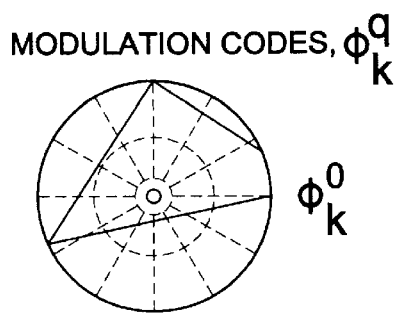
FIGS. 2a–2h is a depiction of a family of codes derived from the SZ(8/64) modulation code used in the present invention.
Figure 2B:
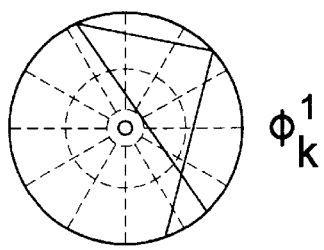
Figure 2C:
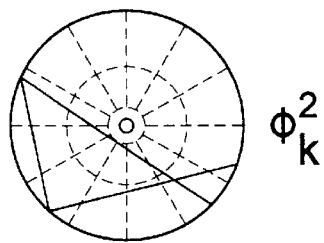
Figure 2D:
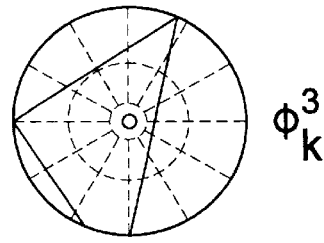
Figure 2E:
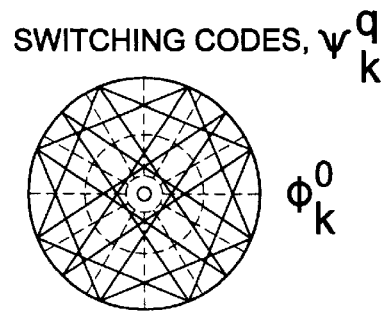
Figure 2F:
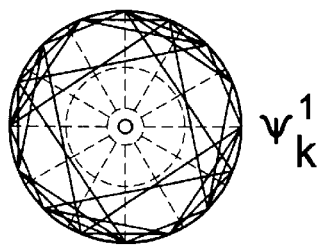
Figure 2G:
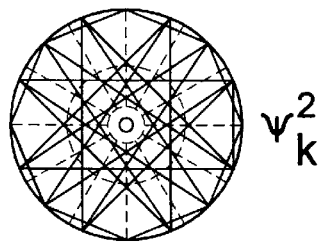
Figure 2H:
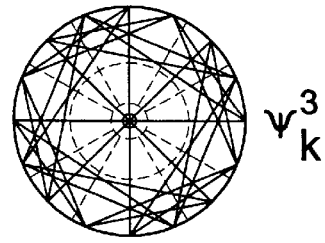

An embodiment of the invention is depicted in FIG. 1. This figure is applicable to any phase coding scheme, including random phase coding. Our contribution is the addition of a digitally controlled phase shifter, the code, and the method to process the overlaid signals.

a) Code

The code is derived from Chu's code (1972). Chu suggested a code for which the code length M is not divisible by n so that its autocorrelation function has a peak at zero lag (and multiples of M) and is zero otherwise. Chu's code is cyclic and can be expressed as:

$\phi_k = n\pi k^2/M$; where k=0, 1, 2, . . .

In our case M is divisible by n and there are M/n autocorrelation peaks within the code length M. This code $\phi_k$ is referred to as the modulation code. For example if the phase shifter is encoded with a suitable code (to be defined shortly) and the first trip echo is phase decoded accordingly (i.e. cohered), the second trip echo will exhibit a phase sequence $\phi_k$ given by the modulation code. After phase decoding the phases $\phi_{i,m}$ of the ith trip return are given by:

$\phi_{1,k} = \Psi_k - \Psi_k$; for the first trip signal (coherent, no modulation);

$\phi_{2,k} = \Psi_{k-1} - \Psi_k$; for the second trip signal;

$\phi_{3,k} = \Psi_{k-2} - \Psi_k$; for the third trip signal;

$\phi_{4,k} = \Psi_{k-3} - \Psi_k$; for the fourth trip signal.

The switching code $\Psi_k$ of the phase shifter is obtained from the sums of the sequence $\phi_k$, $$\Psi_k = -\sum_{m=0}^{k} n\pi m^2 / M; k = 0, 1, 2, \ldots M-1$$

Thus, the proposed switching code $\Psi_k$ is a phase sequence which is a summation of the Chu type code. Furthermore, we have generalized the class of codes that can be used as a switching sequence which is the following code:

$$\Psi_k(q) = -\sum_{m=0}^{k} (n\pi/M) \sum_{p=0}^{2q} (m+p)^2;$$

$q = 0, 1, 2, \ldots (M/2n - 1),$ $k = 0, 1, 2, \ldots L - 1.$

We refer to these as the SZ(n/M) codes. Also for more than two overlaid echoes a subset of codes would work as well (e.g., code n=8, M=64). For the purpose of ambiguity resolution the processing sequence length L should be an integer multiple of the code length M.

To generate the switching code one starts with a modulation code $\phi_k^{(q)}$ as follows, where q is an integer.

$$\phi_k^{(q)} = (n\pi/M) \sum_{p=0}^{2q} (k+p)^2$$

Furthermore, each permissible q yields a different code. Addition of a constant to $\phi_k^{(q)}$ shifts the modulation code and thus generates a switching code with different phases. This, however. does not change the code property or its performance. A negative of $\phi_k^{(q)}$ is also a code. The modulation code can be conveniently viewed by plotting its phases on a unit circle. For the SZ(8/64) this is illustrated in FIGS. 2a–2h. From any one code, other codes can be generated by taking a complex conjugate or by taking a mirror image of the code with respect to any line bisecting the circle. Because these two operations are independent, together they yield 4 codes. All these codes have similar characteristics as far as the present scheme of decoding is concerned.

Figure 3A:
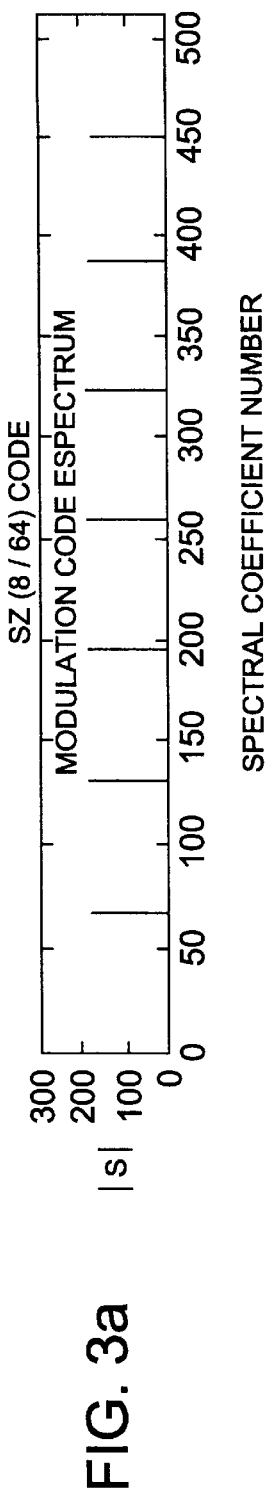
FIG. 3a shows the spectrum of the modulation code SZ(8/64).
Figure 3B:
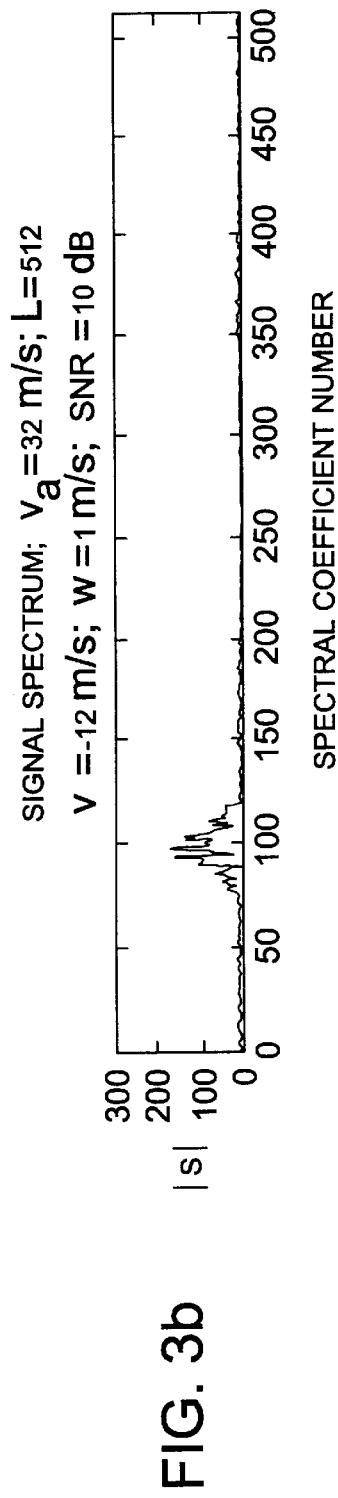
FIG. 3b shows a typical Gaussian weather like spectrum obtained from simulations using a 512 points discrete Fourier transform. The parameters indicated in the figure are, unambiguous velocity $v_a=32$ ms$^{-1}$, mean Doppler velocity $v=-12$ m s$^{-1}$ and the spectrum width is $w=1$ ms$^{-1}$.
Figure 3C:
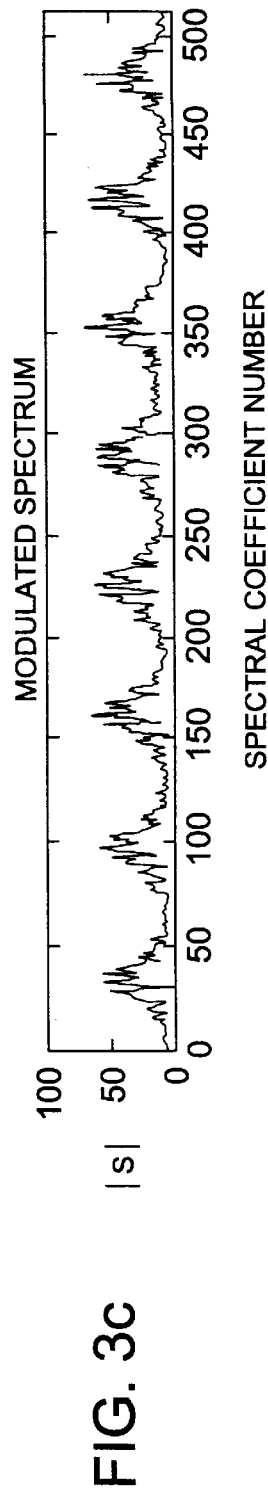
Figure 3D:
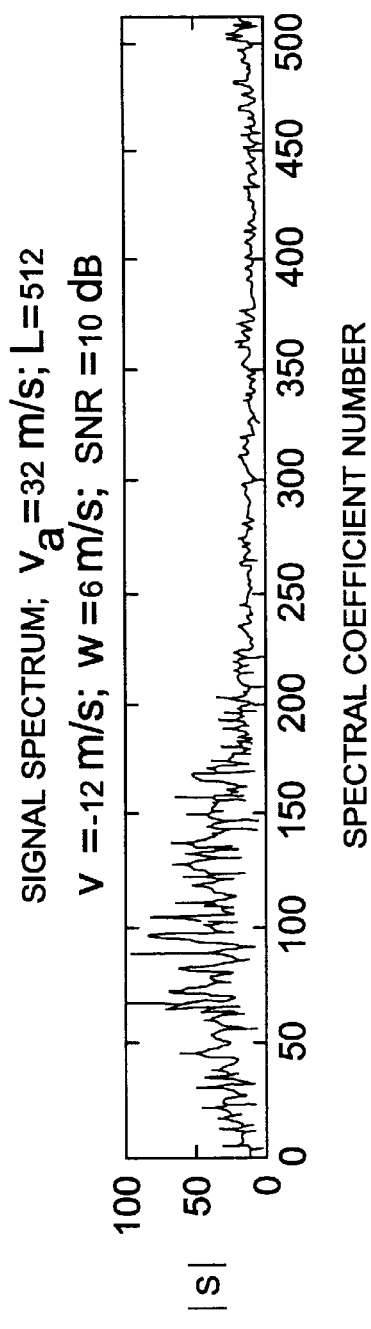
FIG. 3d shows the same view as in FIG. 3a but the weather like simulated spectrum has a width of 6 ms$^{-1}$.
Figure 3E:
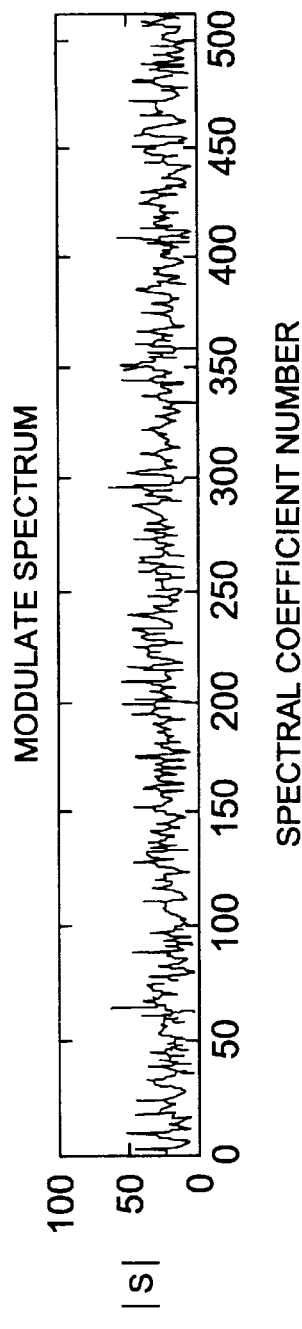
FIG. 3e shows the same view as in FIG. 3c but the modulated signal has a spectrum as in FIG. 3d.

The spectrum of the modulation code of the SZ(8/64) code is plotted in FIG. 3a. In FIG. 3b the spectrum of a signal is shown that when modulated with the code produces the spectrum as shown in FIG. 3c. Eight spectral replicas are clearly displayed in the case of relatively narrow spectra. Modulation of signals that have wider spectra causes significant spectral overlap as can be seen by examining FIG. 3d and FIG. 3e.

b) Retrieval of Velocities

Figure 4:
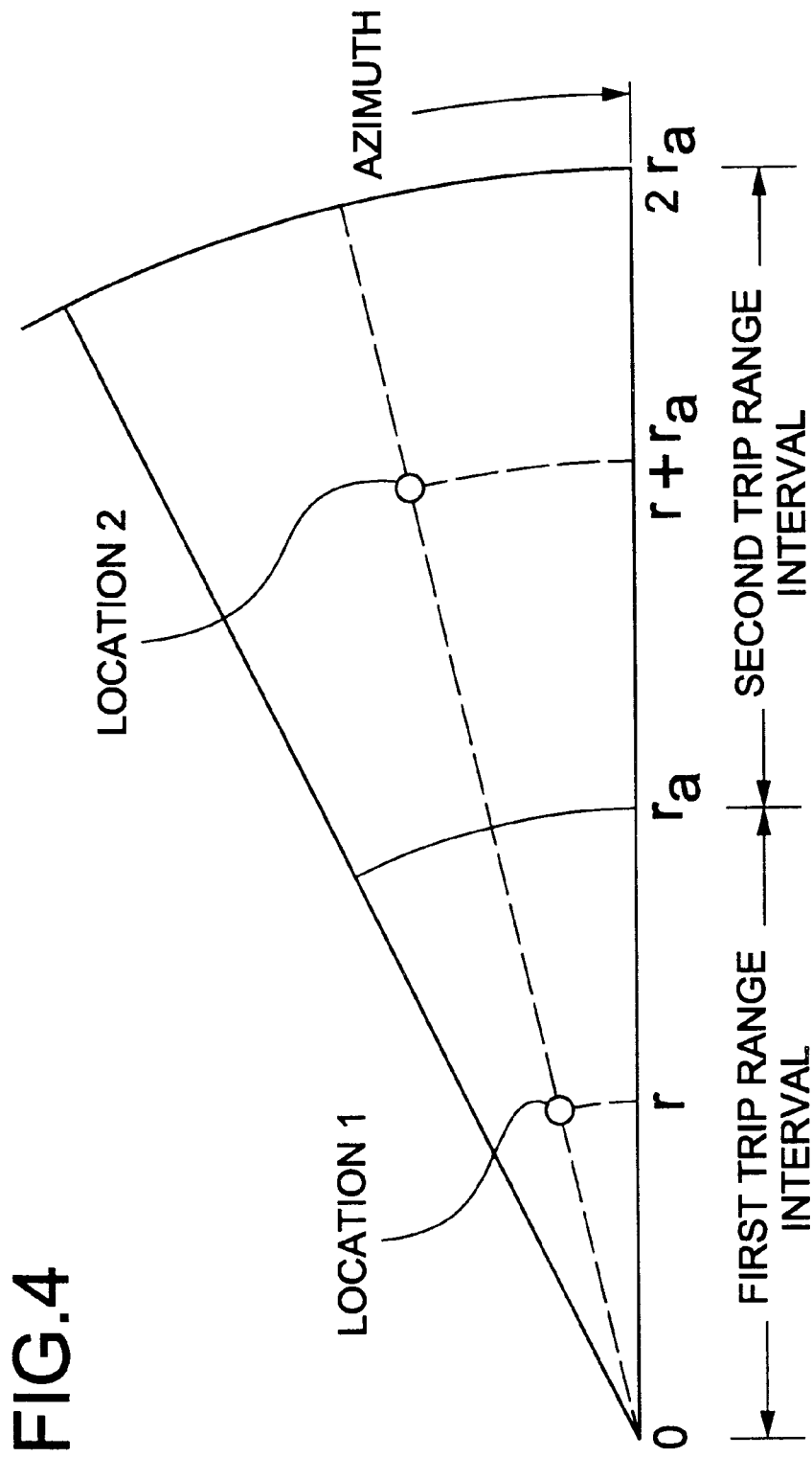
FIG. 4 shows an azimuthal sector of a weather scanning radar. The unambiguous range is $r_a$ and overlaid echoes originate at r and $r+r_a$.

Processing to retrieve spectral moments builds on judicious combinations of classical techniques and on the introduction of magnitude domain spectral deconvolution. In what follows two unambiguous range intervals are considered and it is assumed that the second trip echo is weaker. A sector scan shown in FIG. 4 illustrates the two range intervals and two locations from which echoes arrive at the receiver at the same time. The notation for spectral moments of the two echoes are as follows. The power, mean Doppler velocity and spectrum width of the first and second trip echoes are $p_1$, $v_1$, $w_1$, and $p_2$, $v_2$, $w_2$, respectively. The algorithm to retrieve the spectral moments of the first and second trip echoes is described below. It is meant for use by a fast dedicated signal processor and it assumes that the transmitted pulses have been encoded with an SZ type code.

The procedure is applied to the digital samples (complex in phase and quadrature phase if done at base band) from each range location (i.e., range gate). It is as follows:

1. For each range gate take the time series $E_{1k}$; k=1,2, ... M.

Σ The phase switching sequence is $\Psi_k$; SZ(n/M) code.

2. Cohere the 1st trip signal.

$E_1(k)=E_1(k) \exp\{j\Psi_k\}$

Ist trip is coherent; 2nd trip is phase coded by a sequence $\phi_k = n\pi k^2/M$; k=0, 1, 2 ... M-1.

3. Multiply by von Hann window weights or other taper, $h_k$ $E_1(k)=E_1(k) h_k$ 4. Filter the ground clutter.

$E_1(k)=$filtered $(E_1(k))$.

5. Cohere the second trip.

$E_2^{(k)}=E_{1k} \exp\{j\phi_k\}$

6. Autocovariance process $E_1$ and $E_2$ to get $p_1$, $v_1$, $w_1$, $w_1'$ and $p_2$, $v_2$, $w_2$, $w_2'$ (for the computation of $w_1'$, $w_2'$ use Eq. 6.27 of Doviak and Zrnic, 1993, and for the computation of $w_1$, $w_2$ use Eq. 6.32 of Doviak and Zrnic, 1993).

For computation of $w_1'$ and $w_2'$ use equation 6.27 of Doviak and Zrnic (1993) which is:

$$w = \frac{\lambda}{2\pi T_s \sqrt{2}} \left| \ln \frac{(p)}{R(1)} \right|^{1/2}$$

where w is $w_1'$ or $w_2'$, p is the power estimate of $E_1$ or $E_2$, and R(1) is the autocovarience estimate at lag 1 of the signal $E_1$ or $E_2$, and λ is the radar wavelength and $T_s$ is the pulse repetition time.

For the computation of $w_1$ and $w_2$ use equation 6.32 of Doviak and Zrnic (1993) which is:

$$w = \frac{\lambda}{2\pi T_s \sqrt{6}} \left| \ln \left| \frac{R(1)}{R(2)} \right| \right|^{1/2}$$

where R(2) is the autocovariance estimate at lag 2.

7. Compute $w_1'/w_2'$ ratio.

if $w_1'/w_2'>1$: trip=2 (second trip is stronger)—process $E_2$.

if $w_1'/w_2'<1$: trip=1 (first trip is stronger)—process $E_1$.

8. If trip=2, interchange $E_1$ & $E_2$, and all the parameters in step number 6.

With this interchange, $E_1$ is the time series with stronger signal coherent.

Recover $p_2$, $v_2$ and $w_2$ of the weaker signal.

[Note: The processing steps 9 to 17 are same for the two cases in step 7 with $E_1$ replaced by $E_2$. This is accomplished by step 8 and the trip numbers are restored in step 18.]

9. Compute spectrum of $E_1$.

$S_1'=DFT[E_1]$

10. Set to zero notch $n_w M$ coefficients centered on $v_1$; the notched spectrum is denoted by FIG. 6d.

Note:

(a) $n_w$ is not to exceed the maximum permissible value, (1–2 n/M).

(b) for SZ(8/64) & SZ(12/64) optimum notch filter center location to be computed if trip=I (i.e. Ist trip stronger) and ground clutter filter is applied.

11. Compute mean power p from the remaining coefficients.

Multiply p by $I/(1-n_w)$ to get mean power $P_2$.

12. Compute power ratio $pr=10 \log_{IO}(P_1/P_2)$ dB.

13. If pr<25 dB, correct error in $p_1$ estimate.

$p_1'=p_1-p_2$ compute corrected power ratio $pr=p_1'/p_2$

14. Cohere the weaker signal in $S_1$ as follows.

$e_1=IDFT[S_1]$ if trip=1, $e_2=e_1 \exp\{-j\phi_k\}$ if trip=2, $e_2=e_1 \exp\{j\phi_k\}$ 15. Compute autocorrelation R(1) for $e_2$, and compute mean velocity, $v_2$ 16. Magnitude de-convolution. (for SZ(8/64) and SZ(16/64) only)

compute magnitude spectrum, $S_2'=|DFT'(e_2)|$

Multiply by the de-convolution matrix, $S_2=D S_2'$

[The de-convolution matrix, D, is pre-computed and supplied to the processor] D is obtained by replacing the elements in the convolution matrix with their magnitudes and then inverting the matrix.

17. Compute autocorrelation R(1) for $S_2$, and compute width, $w_2$.

18. If trip=2, inter-change parameters $(p_1,v_1,w_1)$ and $(p_2,v_2,w_2)$

19. Store or display the Ist and 2nd trip parameters then process signals from the next range gate.

A flow chart of the processing procedure is shown in FIG. 5.

An example from simulated time series data is shown in FIG. 6 which illustrates a few essential steps in the recovery of the velocity of the weaker signal.

Figure 6A:
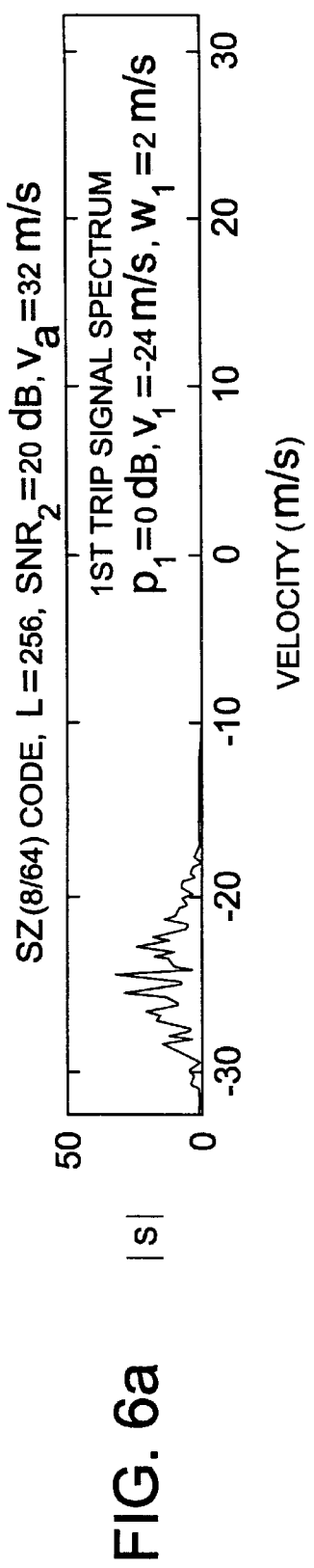
FIGS. 6a–6f show an illustration in the spectrum domain of steps that lead to the recovery of the weaker echo's mean velocity and spectrum width.
Figure 6B:
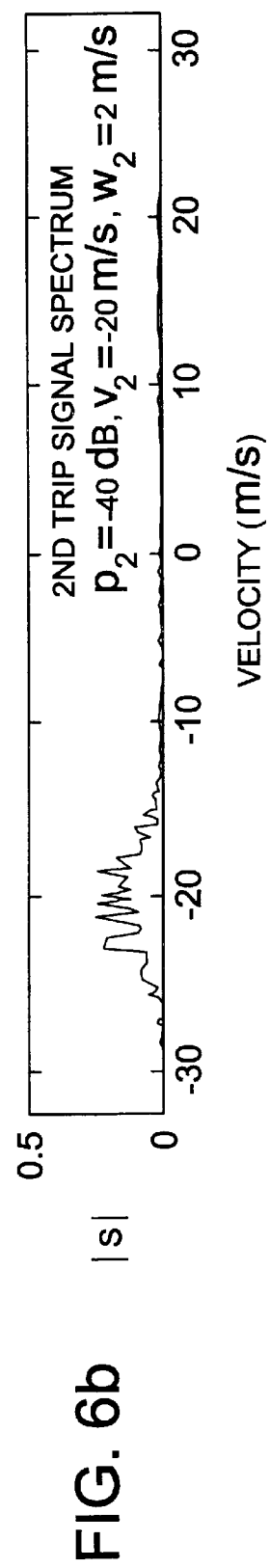
Figure 6C:
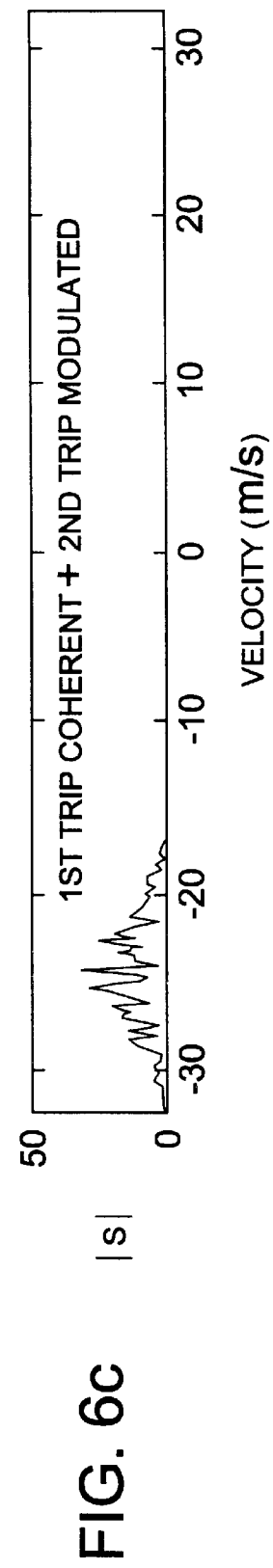
Figure 6D:
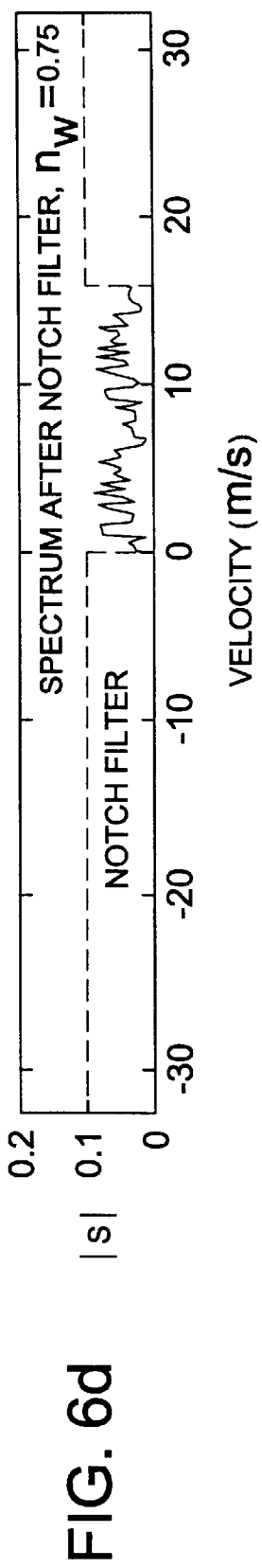
Figure 6E:
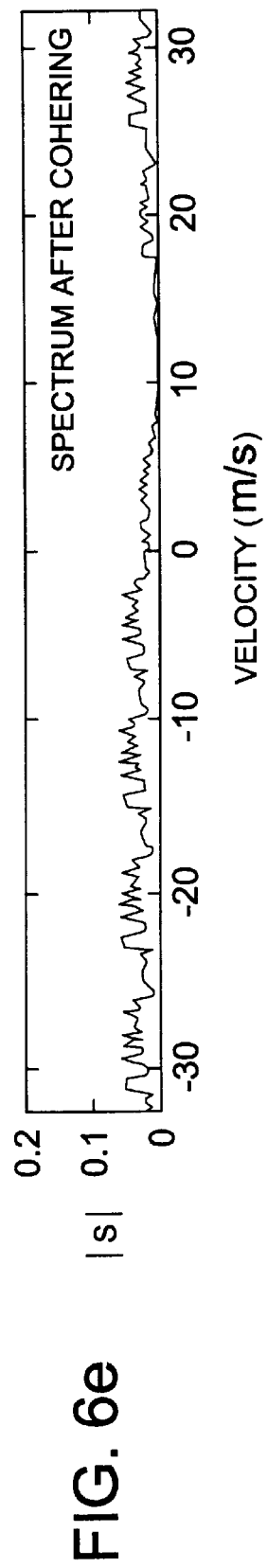
Figure 6F:
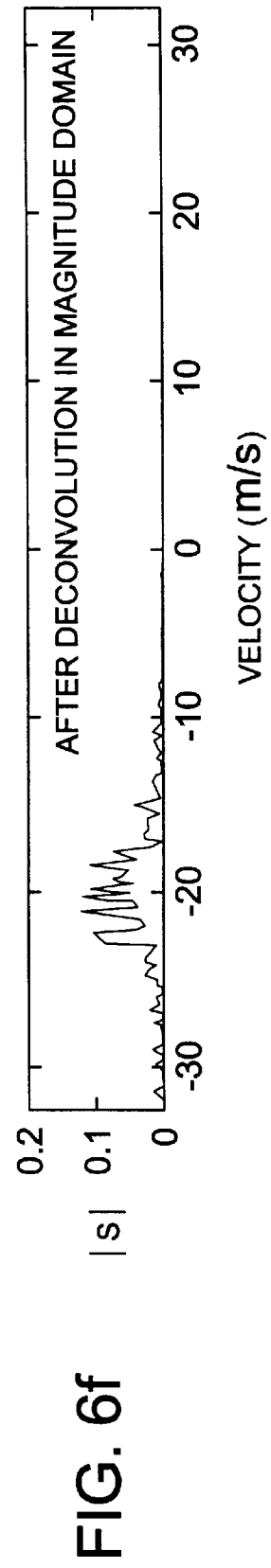

The spectrum of the first trip echo in the absence of the other overlaid echoes is in FIG. 6a. Similarly the spectrum of a much weaker second trip echo with no overlaid signals is in FIG. 6b; the scales on the abscissa differ by a factor of 100. If these two signals are overlaid the spectrum looks as in FIG. 6c where the weaker signal is not discernible. Centering the notch filter on the first trip spectrum and thus eliminating 75% of the spectral coefficients results in a spectrum shown in FIG. 6d. Cohering the second trip signal produces a wider spectrum than the original (compare FIG. 6b with FIG. 6e). The cohering process consists of inverse DFT and multiplication by the shifted complex conjugate of the modulation code. The spectrum of the cohered signal is shown in FIG. 6e. Deconvolution in the magnitude domain of the spectrum in FIG. 6e results in a faithful reproduction of the original spectrum of the weaker (second trip) signal (compare FIG. 6d with FIG. 6b).

The procedure owes its success to the code, as expressed above. Furthermore there are several crucial original steps that make the difference between success and failure.

First, there is the notch filter which has a maximum normalized width of (1–2 n/M). Smaller widths remove less of the undesirable signal and larger widths preclude reconstruction of the weaker signal.

Second there is the deconvolution procedure used for obtaining the spectrum width. It is performed in the magnitude domain. In this procedure the deconvolution matrix is synthesized from the magnitudes of the spectral coefficients of the code and is stored in the memory of the processor. This is crucial for obtaining the spectrum width of the weaker signal.

The third element deals with the code and processing of overlapped signals. Cyclic codes with lengths that are powers of two are very convenient because such sequences are amenable to efficient Fourier analysis. Several of our codes have the shift invariant property. This is desirable if one needs to preserve azimuthal resolution. Thus weighting by a window function and overlapping the signals for processing is natural for this code (see FIG. 7).

Figure 7:
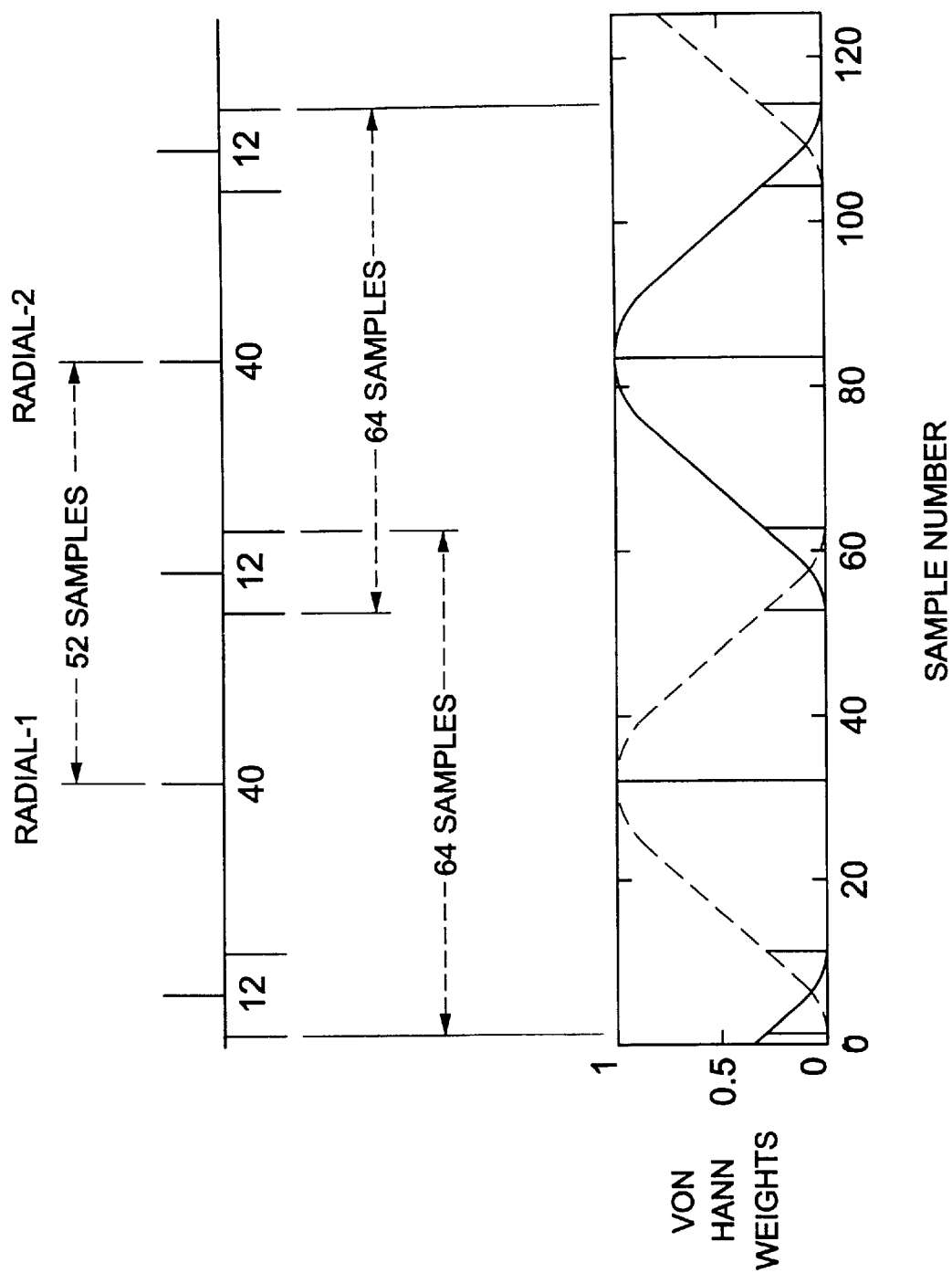
FIG. 7 shows a proposed sample overlap scheme for obtaining a 64 length sequence.

FIG. 7 shows the positions of 128 contiguous time samples. The first 64 are weighted by the Von Hann weights and then processed according to the outlined algorithm. Some of our codes allow the processing for the next estimate to start before the sequence for processing the current estimate has ended. For example, in FIG. 7 new estimates are generated every 52 samples but the code length is 64 samples; new samples can be generated at other than 52 spacings as well. This is significant because the azimuthal resolution which depends on the number of processed samples needs to be preserved.

Figure 8A:
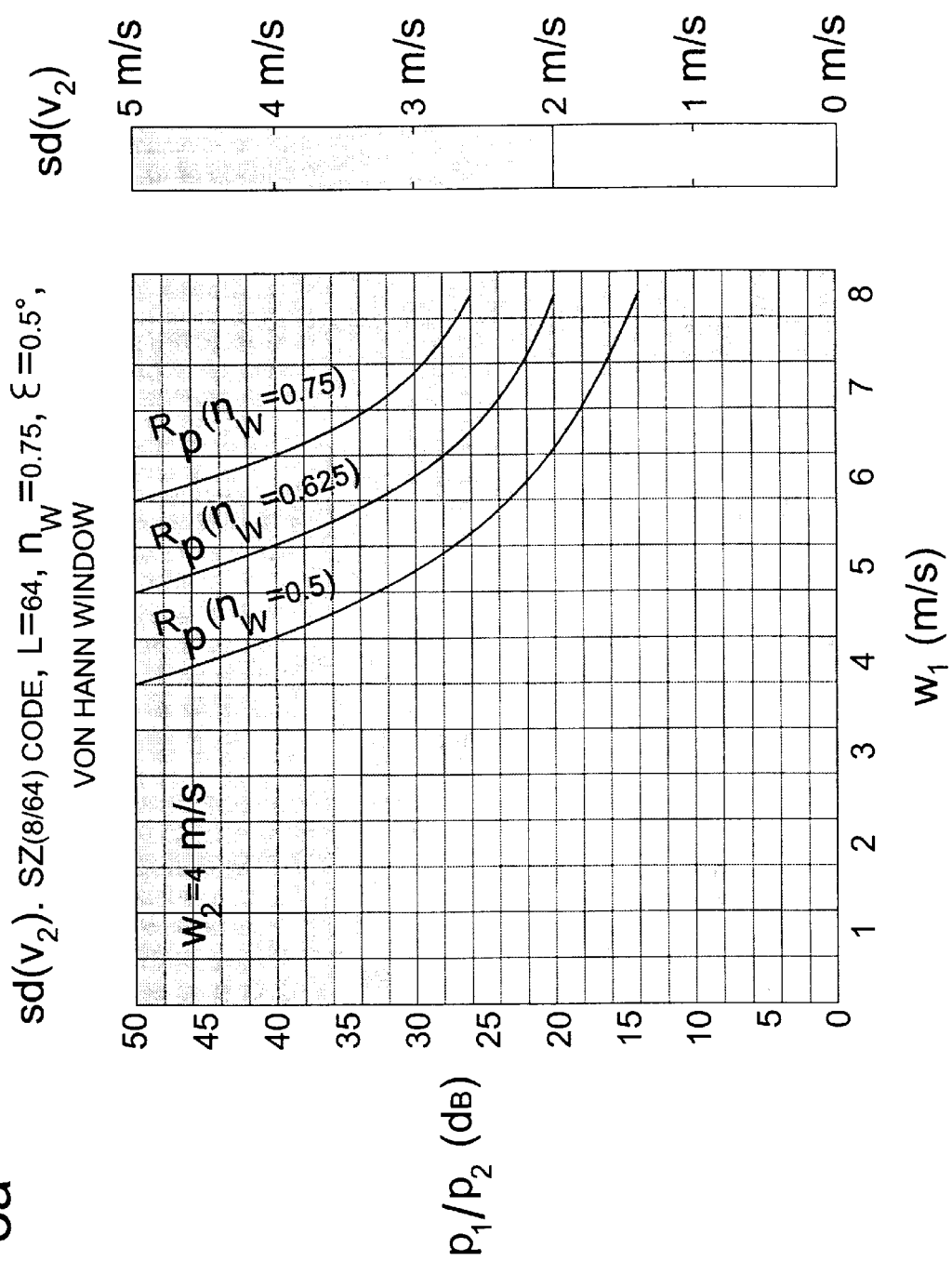
FIG. 8a shows the standard error in velocity estimates for the procedure that uses the SZ code.
Figure 8B:
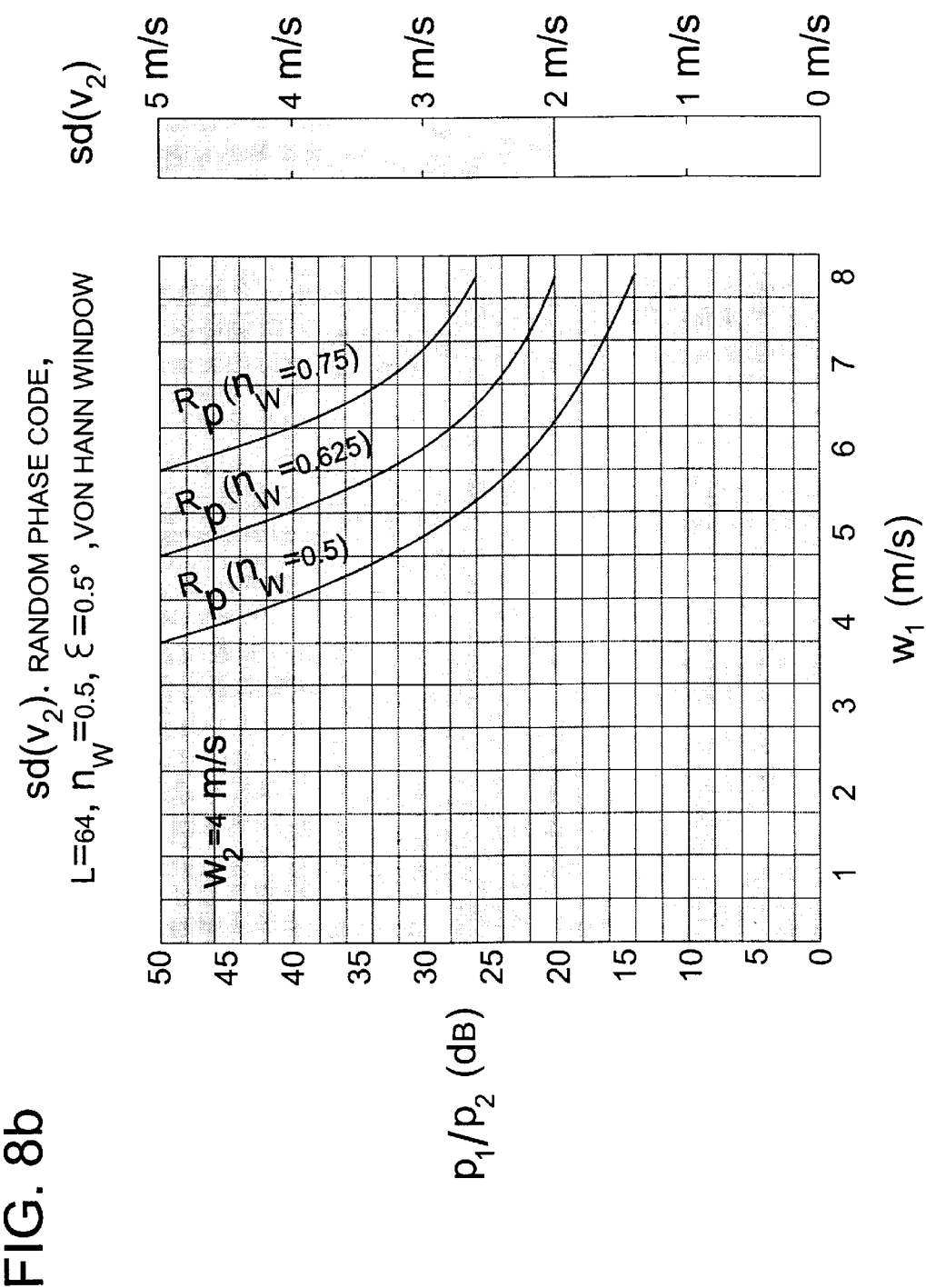
FIG. 8b shows the standard error in velocity estimates for the procedure that uses the random phase code.

FIGS. 8a and 8b give a comparison of performance of the present code and the previously used random phase code. The procedures for retrieving the velocity using these codes are the same except for the notch filter width which is larger for the SZ code and the deconvolution for estimating. The spectrum width which is not applicable to the random phase code. These figures were obtained from simulations of overlaid signals. The signals were encoded with the SZ(8/64) code and subjected to retrieval according to the algorithm. The signal sequence is composed of 64 samples. The width of the notch filter is 75% for the SZ code and 50% for the random phase code. The spectrum width of the second trip signal is 4 m/s. On the ordinate is the Doppler spectrum width $w_1$ of the stronger (first trip) signal. On the abscissa is the power ratio of the stronger to weaker signal. The 2.5 dB by 0.5 m/s rectangles are shaded to represent the average standard deviation of velocity estimates $v_2$ of the weaker (second trip signal). The results are valid for a typical wavelength of 10 cm (pulse repetition time of 0.78 micro seconds) or for a 5 cm wavelength but with a two times shorted pulse repetition time. At other wavelengths the graphs are valid for pulse repetition times equal to 0.78 micro seconds times one tenth of a wavelength (in cm).

The magnitude domain deconvolution procedure, explained in the context of uniform PRT transmission and SZ phase coded Doppler weather radar signals, in conjunction with the spectral domain clutter filtering, is applied to the signals from a Doppler weather radar using staggered PRT transmission to resolve the range and velocity ambiguity.

In the proposed implementation, the transmitted pulses are staggered in time, i.e., the PRT is changed to $T_1$ and $T_2$ alternately. This scheme provides an unambiguous velocity $$V_a \pm \lambda / \{4(T_2 - T_1)\}$$

and an unambiguous range $$r_a = cT_1/2.$$

The major problem which has prevented implementation of the staggered PRT scheme in practical radars is the clutter filtering. All the available methods of clutter filtering produce spurious rejection bands in the filter response which prevents estimation of the velocity in these frequency bands.

The proposed spectral domain clutter filtering procedure eliminates this problem of loss of velocity information. The procedure also uses the magnitude domain deconvolution to reconstruct the signal spectrum, which allows estimation of the spectral parameters with much lower standard error than was possible before.

Figure 9A:
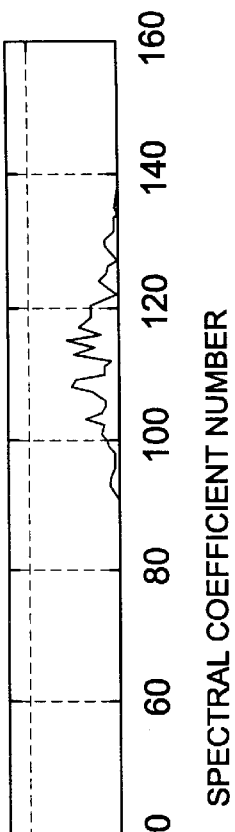
FIGS. 9a–f show the spectral processing steps in the staggered PRT transmission scheme for ambiguity resolution.
Figure 9B:
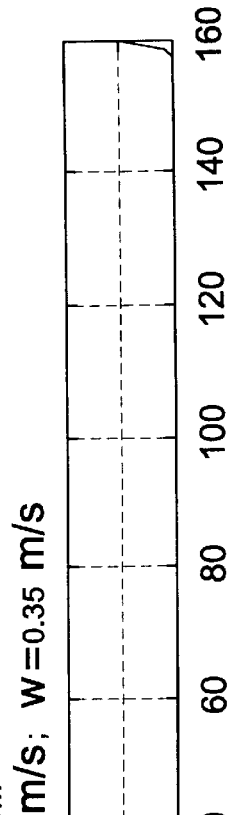
Figure 9C:
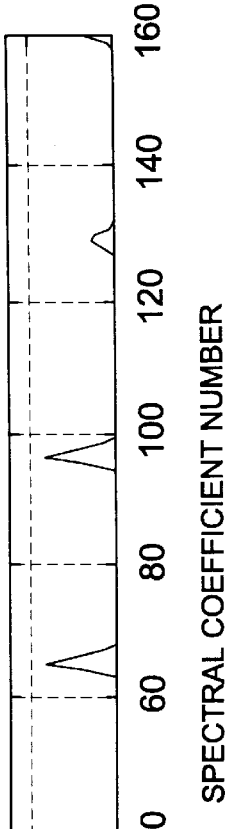
Figure 9D:
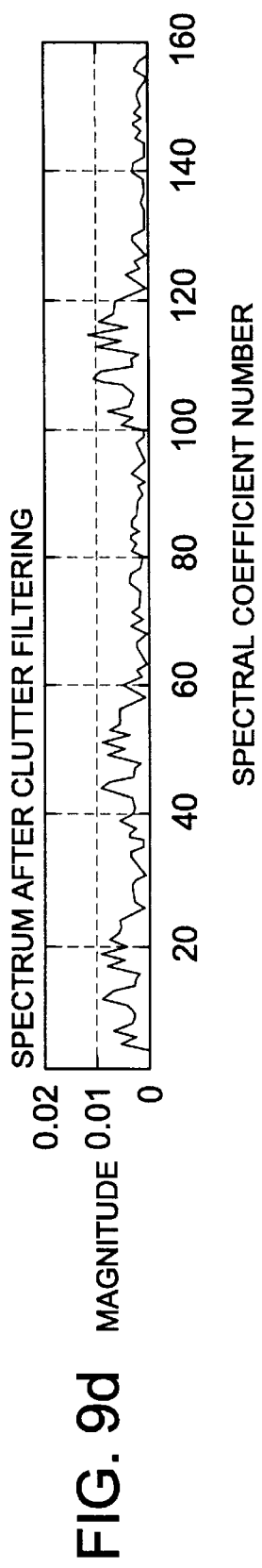
Figure 9E:
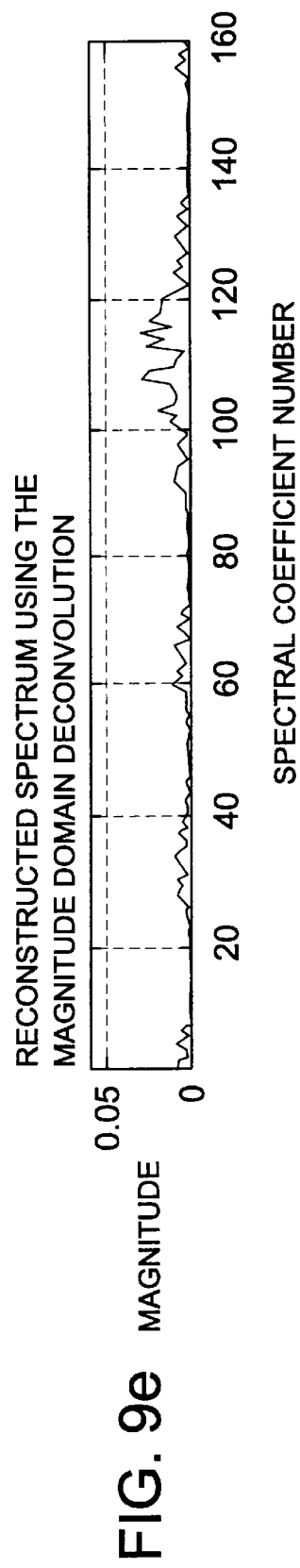
Figure 9F:
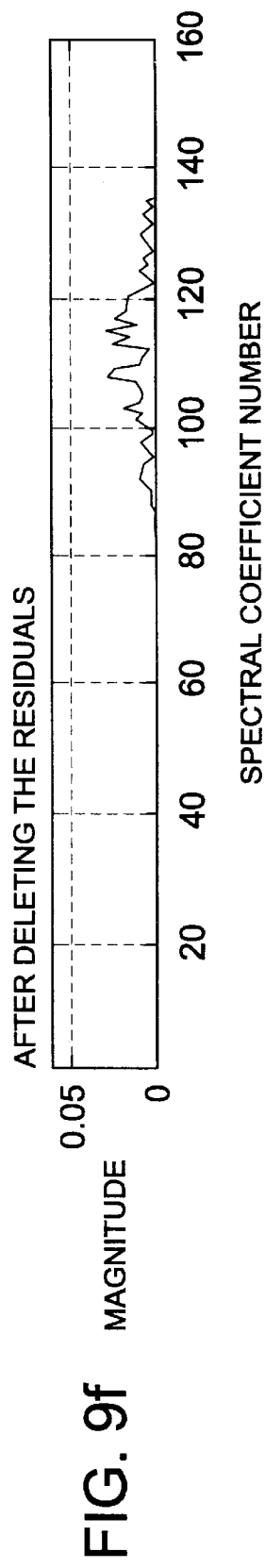

FIGS. 9a–9f illustrate the processing steps for signal samples obtained in the staggered PRT mode. FIG. 9a shows a simulated signal spectrum which is sought to be recovered. In FIG. 9b is the clutter spectrum. The clutter power is 40 dB above the signal power. The uniform PRT sequence with the spectrum in FIG. 9c is obtained from the staggered PRT sequence by inserting zeros for the missing samples. This spectrum consists of weather signal and clutter, but the signal is not visible because it is 40 dB below the clutter. Note that the clutter power spreads over five bins. FIG. 9d is the recovered signal after clutter is filtered. The original spectrum is reconstructed using the magnitude domain deconvolution as shown in FIG. 9e. There are some residuals that remain because of the overlap of the signal and clutter spectral coefficients. These are deleted after the mean velocity is estimated (FIG. 9f).

The clutter filtering and the spectrum reconstruction procedure is as follows:

1. The received stagger PRT sequence is converted to a uniform sequence by inserting zeros for missing samples. Then suitable window weights are applied. The discrete Fourier transform of this sequence is expressed as a convolution of the original signal (plus clutter) spectrum and the spectrum of the code. The code is a sequence of ones and zeros; ones represent the staggered samples and zeros represent the missing samples. For example, the code is 1010010100 . . . etc. for $T_1/T_2=2/3$. In matrix notation this is written as $$[V] = [C_v][E]$$

where [E] is the column vector of the spectral coefficients of the original signal (plus clutter), $[C_v]$ which is the convolution matrix obtained from the code spectrum, and [V] is the column vector of the spectral coefficients of the derived uniform PRT sequence (i.e., inserted with zeros and windowed).

If N is the number of samples in the zero padded sequence, the convolution matrix, $[C_v]$, will have only p non-zero coefficients in each row(or column), determined by the code periodicity (e.g., p=5 for $T_1/T_2=2/3$).

2. In the proposed method spectral coefficients $V_i$; i=1,2 . . . N, are cut into p row vectors, each having M=N/p coefficients, and are written as a (p×M) matrix, $[V_r]$.

3. The non-zero elements of the code spectrum are arranged as a column matrix, $[C_1]$, of size (p×1), from which the (p×p) clutter filter matrix, $[C_{f1}]$, is obtained as $$[C_{f1}] = [C_1][C_1]^t.$$

The superscript "t" represents complex conjugate transpose of the matrix. Similarly, column matrix $[C_2]$ is obtained by shifting the elements of $[C_1]$ by one; i.e., take the first element and place it at the last position. The second clutter filter matrix is obtained as $$[C_{f2}]=[C_2][C_2]^t.$$

4. Select a width for the clutter filter in terms of the number of coefficients in the spectrum. The clutter is confined to the first few and the last few columns of the matrix $[V_r]$. Form two diagonal matrices, $[I_{f1}]$ and $[I_{f2}]$ whose diagonal consists of ones corresponding to the columns where the clutter is to be filtered and zeros for the rest. The diagonal of the first matrix has first few ones, and the diagonal of the second matrix has the last few ones and the rest zeros.

5. Compute the clutter filtered signal spectrum matrix, $[V_f]$, using the equation $$[V_f]=[V_r]-[C_{f1}][V_r][I_{f1}]-[C_{f2}][V_r][I_{f2}]$$

This equation subtracts the clutter from the spectrum and retains only the weather signal part. This clutter filter does not bias the velocity and has no spurious rejection bands.

6. Rearrange the elements of $[V_f]$ into a column matrix and then carry out the magnitude domain deconvolution to reconstruct the original signal spectrum. Mathematically, this is written as $$[|E|]=[|C_v|]^{-1}[|V_f|]$$

Here, the deconvolution matrix is the inverse of the magnitude convolution matrix.

7. Compute the mean velocity from the magnitude spectrum $[|E|]$ either using the phase of the autocorrelation or the first moment of the spectrum.

8. The residual spectral coefficients outside (2N/p−q) coefficients (q is the clutter fitter width) centered on the mean velocity are deleted and the mean power and spectrum width are estimated using standard formulae (q is the width of the clutter filter in terms of the spectral coefficients). The residuals do not produce appreciable bias error in the velocity.

Figure 10:
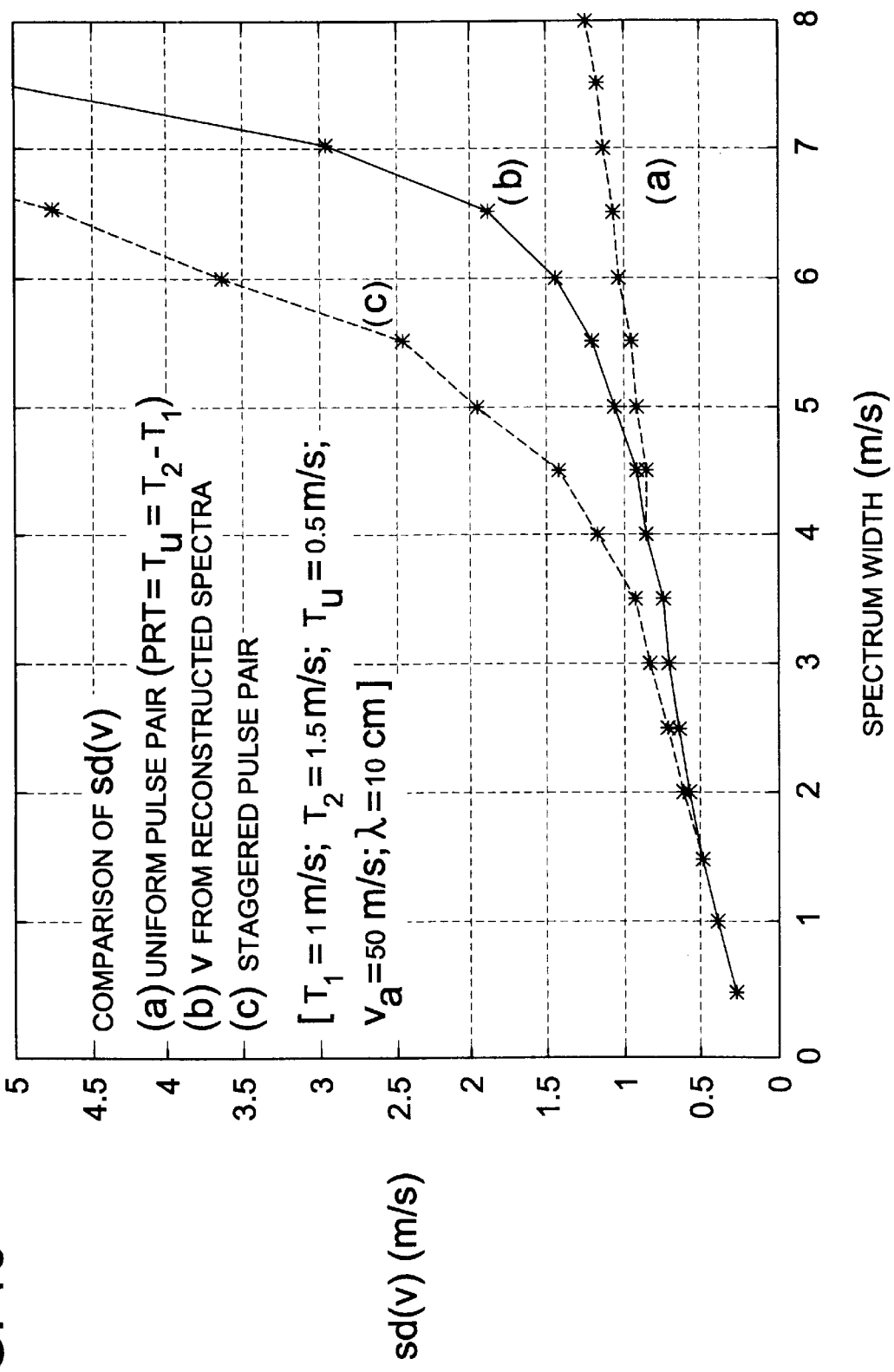
FIG. 10 shows the improvement in the standard error in the velocity estimate using the present spectral processing method over the method using the ratio of autocorrelations.

The proposed signal processing method on staggered PRT sequences achieves a much lower standard error in the estimates than available from existing techniques. FIG. 10 gives comparison of the standard errors in the velocity estimates obtained with the present method and the previously reported method. Curve (a) is for the ideal situation where a complete sequence is available, and is given as a reference.

Figure 11:
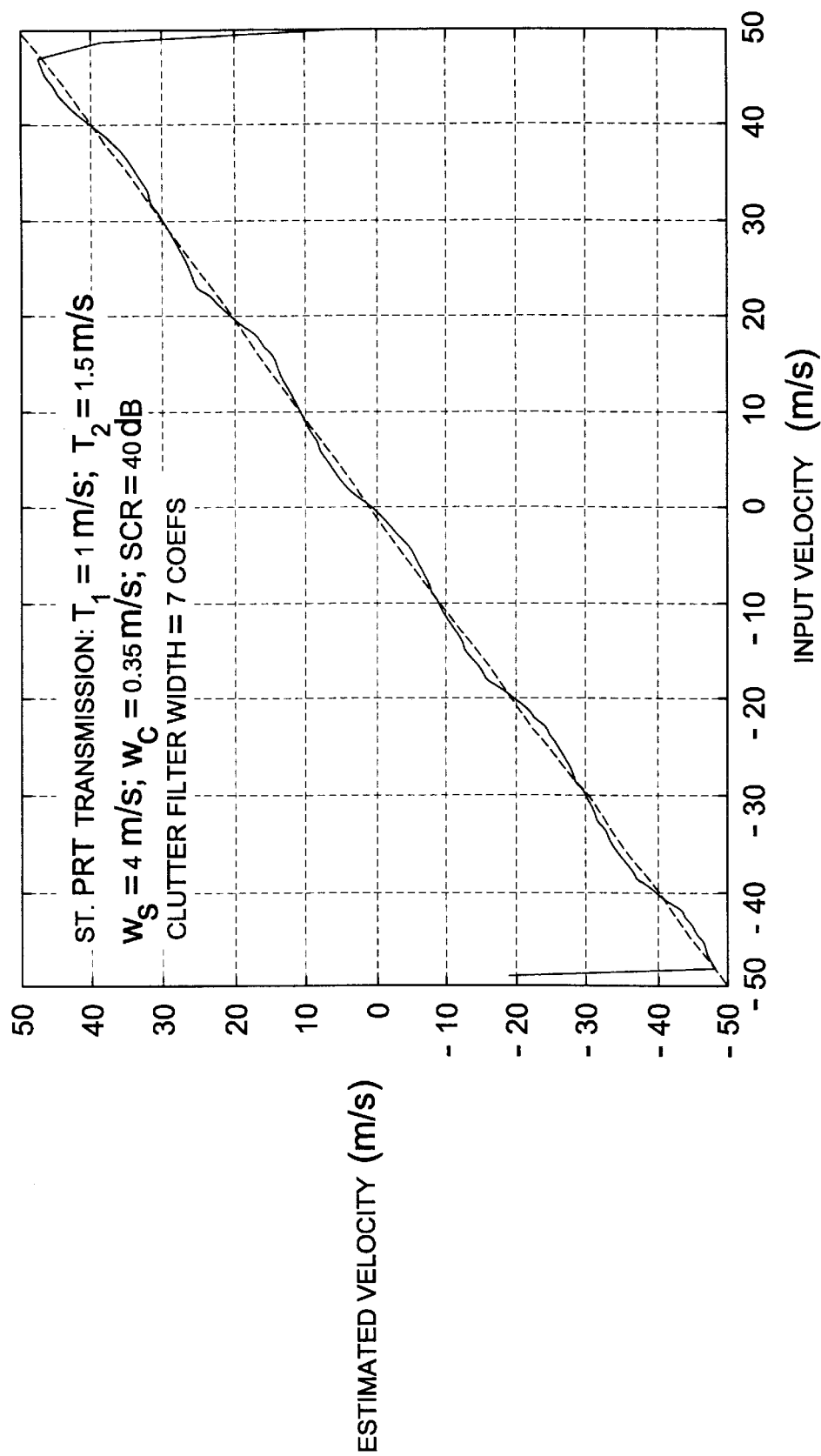
FIG. 11 shows the effectiveness of the present clutter filtering procedure in estimating the velocity and resolving the velocity ambiguity.

The velocity recovery by the present method in the presence of ground clutter (40 dB clutter-to-signal ratio) is depicted in FIG. 11. The velocity estimates are nearly bias free and there are no spurious rejection bands. The large errors at the extreme ends are due to aliasing.

Although the method for resolving range and velocity ambiguities in a Doppler weather radar and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A method for resolving range ambiguities and separating signals in a Doppler weather radar, wherein said method comprises:

phase coding transmitted pulses from said radar with Chu's code, and phase decoding of said coded pulses to make echoes from a specified range ambiguous interval coherent, and said decoding splits the spectrum from echoes from said range interval, said spectra have the same shape but are offset from each other.

2. The method for resolving range ambiguities as claimed in claim 1, wherein a phase $\Psi_k$ of the $k^{th}$ transmitted pulse is determined by $$\Psi_k(q) = -\sum_{m=0}^{k}(n\pi/M)\sum_{p=0}^{2q}(m+p)^2;$$

$$q = 0, 1, 2, \dots (M/2n-1),$$

$$k = 0, 1, 2, \dots L-1.$$

3. The method for resolving range ambiguities and separating signals in a Doppler weather radar, wherein said method comprises:

transmitting a phase coded sequence, for each range gate take a time series sequence, cohere a first trip echo, multiply by a window weight, filter a ground clutter, cohere a second trip echo, autocovariance process said first and second trip echoes, compute ratio of estimated widths of the widths of said first and second trip echoes, if said ratio is less than unity, said first trip echo is stronger than said second trip echo, if said first trip echo is stronger than said second trip echo, process time series samples in which the first trip echo is coherent, if said second trip echo is stronger than said first trip echo, process time series samples in which the second trip echo is coherent, recover power, mean Doppler velocity and spectrum width of a weaker trip echo, compute a spectrum width of a stronger trip echo, notch coefficients centered on a mean Doppler velocity of the stronger trip echo, compute a mean power of the weaker trip echo, compute a mean power ratio of the stronger to weaker trip echo, if the power ratio is less than 25 dB, correct error in the mean power of the stronger trip echo, compute the corrected mean power of the stronger trip echo, cohere the weaker trip echo in the spectrum, compute autocorrelation for the cohered weaker trip echo, and compute a mean velocity of the weaker trip echo, compute a magnitude spectrum for the weaker trip echo, multiply the magnitude spectrum for the weaker trip echo by a de-convolution matrix, compute autocorrelation for the weaker trip echo, compute the spectrum width for the weaker trip echo, display the power, mean Doppler velocity and spectrum width of the stronger trip echo and the weaker trip echo, output the power, mean Doppler velocity and spectrum width of the stronger and weaker trip echoes and proceed to a next range gate.

4. The method as claimed in claim 3, wherein the spectrum width of the weaker trip echo is an estimation, and said estimation consists of magnitude domain spectral deconvolution, and said deconvoluted spectra are processed to retrieve the spectrum width.

5. A method to filter ground clutter from the signal samples of a Doppler weather radar using a staggered PRT transmission scheme for velocity ambiguity resolution, wherein said method consists of:

transmitting pulses with pulse repetition times T1 and T2 alternately, inserting said signal samples with zeros to make said signal samples a uniformly sampled sequence, and then multiplying the uniformly sampled sequence by a window function, rearranging spectral coefficients of a uniform sample sequence into a matrix $[V_r]$, computing clutter filter matrices $[C_{f1}]$ and $[C_{f2}]$, based on a code sequence for a $T_1/T_2$ ratio, determining clutter filter width in terms of number of spectral coefficients, multiply column vectors of said matrix $[V_r]$ containing the clutter by said clutter filter matrix thereby obtaining a result, and subtracting the result from said column vectors.

6. A magnitude domain deconvolution procedure to reconstruct a signal spectrum from signal samples of a Doppler weather radar using a staggered PRT transmission scheme for velocity ambiguity resolution, wherein said method comprises:

rearranging a matrix $[V_r]$ into a column matrix and then carrying out a magnitude domain deconvolution, and wherein said magnitude domain deconvolution consists of multiplying a signal spectrum magnitude [|V|] by an inverse of the magnitude domain deconvolution, computing mean velocity from the magnitude domain deconvolution deleting residual coefficients and then estimating a spectrum width and mean power.

* * * * *